May 17, 1960  J. SHAW  2,936,974

FUEL SYSTEM RESPONSIVE TO ANGLE OF ATTACK

Filed Nov. 9, 1954

INVENTOR
JACQUES SHAW
BY
AGENT

United States Patent Office 2,936,974
Patented May 17, 1960

2,936,974

FUEL SYSTEM RESPONSIVE TO ANGLE OF ATTACK

Jacques Shaw, Manchester, Conn., assignor to United Aircraft Corporation, East Hartford, Conn., a corporation of Delaware Application November 9, 1954, Serial No. 467,815

5 Claims. (Cl. 244—76)

This invention relates to fuel controls for airplane engines, more particularly to the compensation of fuel flow to the engine for changes in angle of attack of the airplane.

In the control of airplanes, particularly of the type of guided missiles, it is important that any change in angle of attack be promptly sensed so that the engine fuel control output can be varied to overcome the tendency of the airplane speed to change. Thus, if the angle of attack of a missile should increase, drag will increase and speed will tend to decrease, and fuel flow to the engine must be increased to maintain the momentum of the missile.

The invention is the combination of a Mach probe and a gas turbine or ram jet engine fuel control, the probe being mounted on an airplane surface in the airstream externally of the engine to register ram and static pressures and sending signals to the engine fuel control to regulate fuel flow when a change in angle of attack occurs.

An object of this invention is to compensate the fuel system of an airplane for changes in attitude of the airplane. Another object of the invention is to provide a Mach probe for a guided missile which compensates the fuel supply to the missile engine for changes in missile speed.

Another object of the invention is to provide a device which senses flight Mach number in such a manner that improved engine response and airplane speed stability may be obtained. Still another object of the invention is to reduce the low altitude equilibrium Mach number of an airplane to prevent airframe and engine components from exceeding allowable limits at high speed, low altitude flight.

Other objects and advantages will be apparent from the specification and claims and from the accompanying drawing which illustrates embodiments of the invention.

Figure 1:
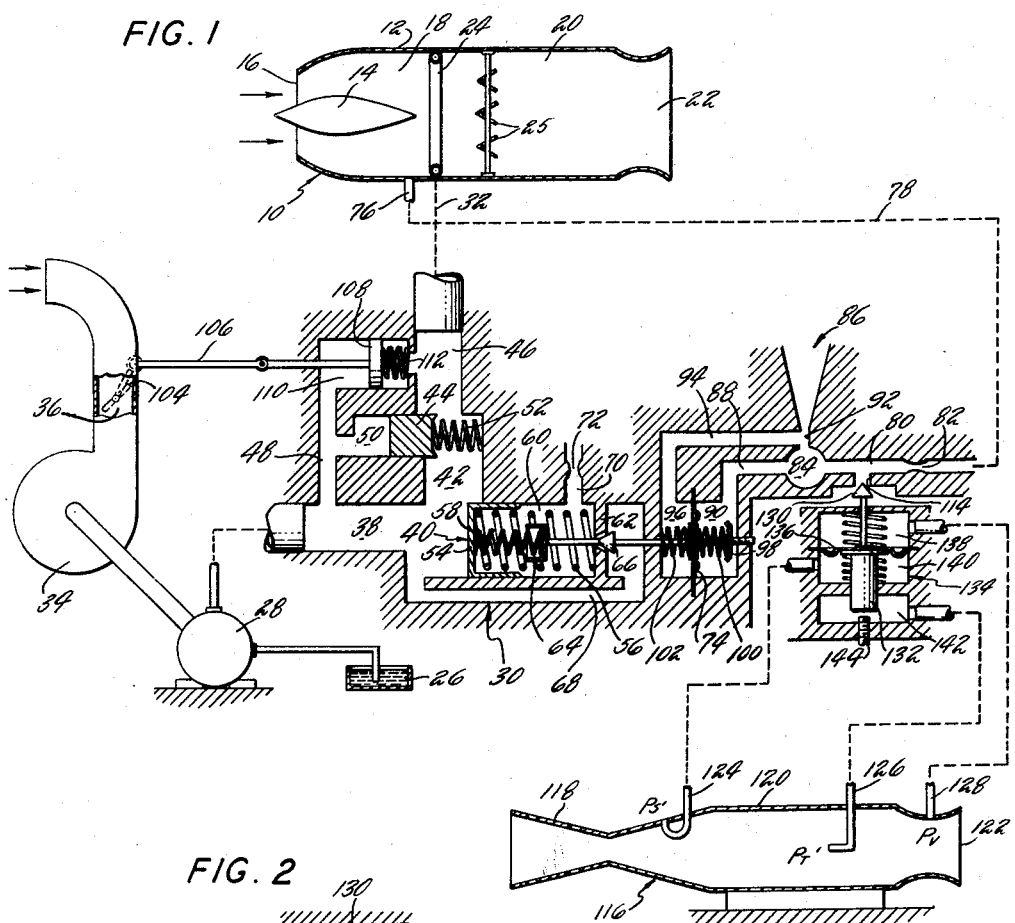
Fig. 1 shows a fuel system for a ram jet engine having the Mach control of this invention incorporated therein.

Referring to the drawing in detail, in Fig. 1 a ram jet engine is shown generally at 10. The engine includes outer casing 12 having cone 14 mounted therein defining inlet 16 and diffuser chamber 18. Downstream of the diffuser is burner 20 and exhaust nozzle 22. Fuel injection ring 24 is mounted within casing 12 immediately downstream of cone 14 and supplies fuel which is mixed with the air and burned in burner 20, flameholder 25 therein assuring continuous combustion.

Fuel for the engine is supplied from tank 26 by pump 28 through fuel control 30 and line 32 connecting the fuel control and fuel ring 24. The pump is connected to and driven by air turbine 34 which receives ram air through inlet duct 36. Fuel from pump 28 enters chamber 38 in fuel control 30 and passes through metering valve 40 into chamber 42 and from this chamber through pressure regulating valve 44 into chamber 46 which is connected to line 32 and fuel ring 24. One face of pressure regulating valve 44 is subject to the pressure in chamber 42 on the downstream side of metering valve 40 and the opposite face of valve 44 is connected through passages 48 and 50 with the pressure in chamber 38 on the upstream side of metering valve 40. Thus, pressure regulating valve 44 is subject to the pressure differential across metering valve 40 and through spring 52 in chamber 42, which acts to assist the pressure on the downstream side of the metering valve, regulates the pressure drop across the metering valve. By maintaining the pressure drop constant, fuel flow through metering valve 40 is proportional to the area of the valve port.

Spring loaded piston 54 controls the area of metering valve 40. The position of this piston is determined by the difference between the fuel pressure in chamber 38 and the fuel pressure, as well as the loading of linear rate springs 56 and 58, in chamber 60 on the back side of the piston. Spring 56 is interposed between the piston and wall 62 and spring 58 is interposed between the piston and shoulder 64 on poppet valve 66 which, cooperating with wall 62, controls the flow of fuel from passage 68, connected to chamber 38, into chamber 60. Passage 70 and restriction 72 interposed therein vent chamber 60 to drain and render the servo system of the metering valve dynamic.

Poppet valve 66 is connected to flexible diaphragm 74 and the position of the diaphragm determines the position of the poppet valve and thus the flow of fuel through chamber 60, which in turn determines the position of piston 54 and the area of metering valve 40. Diaphragm 74 is subject to a pressure differential which is representative of airflow through engine 10. Any convenient pressure or pressures may be used and in this case the pressure at the subsonic diffuser exit has been chosen. Static pressure station 76 in the engine near the diffuser exit, downstream of any normal shock that might occur during engine operation, is connected through line 78 to passage 80 in fuel control 30. Restriction 82 is used at the inlet to the control passage in order to stabilize the pressure signal and to permit modulation thereof as will be explained below. Passage 80 is connected to plenum chamber 84 in pressure divider 86 which, in turn, is connected through passage 88 to chamber 90 on the right-hand side of diaphragm 74.

Pressure divider 86 is used to permit measuring the engine subsonic diffuser pressure as a differential rather than measuring it absolutely. This eliminates the need for using evacuated bellows which are known to be inefficient. Pressure divider 86 accomplishes this through its contouring which is such that the throttling which occurs at throat 92, open to atmosphere or lower pressure to form a sonic nozzle, is equal to about $.53 P_2$, $P_2$ being the diffuser pressure at station 76. The pressure at throat 92 is introduced through passage 94 to chamber 96 on the left-hand side of diaphragm 74. Thus, the diaphragm unit measures $P_2$ minus $.53P_2$, which equals $.47P_2$, a function of $P_2$. Adjustable abutment 98 and springs 100 and 102 on the opposite sides of diaphragm 74 permit biasing the diaphragm unit in any suitable manner. The servo system of metering valve 40 serves to multiply the force of diaphragm 74 to permit piston 54 to be moved in response to movement of diaphragm 74.

Throttle valve 104 is positioned in inlet duct 36 to control the flow of ram air to air turbine 34 to prevent serious fuel overheating and cavitational problems likely to be encountered if the fuel pump is driven at a speed in excess of the speed necessary to provide the required engine fuel flow. Positioning of the throttle is accomplished through linkage 106 connected to piston 108 in chamber 110. Opposite sides of piston 108 are subject to the pressure drop across metering valve 40 and pressure regulating valve 44 so that the throttle is positioned in accordance with this pressure drop. Chamber 110 is connected through passage 48 to chamber 38 to render the left side of piston 108 subject to upstream pressure and chamber 110 is connected with chamber 46 to render the right-hand side of piston 108 subject to downstream pressure with respect to pressure regulating valve 44. Spring 112 tends to urge the piston in a direction opening throttle valve 104.

Mach control of fuel flow to the engine is accomplished by introducing a variable bleed 114 downstream of restriction 82 in engine air flow signal pressure passage 80. The area of this bleed is controlled as a ratio of pressures sensed in Mach probe 116 mounted on the airplane structure as close to the engine as possible and in the airstream in an area free of interference from any adjacent airplane elements. The probe comprises perforated convergent-divergent inlet diffuser 118, settling section 120, and exhaust nozzle 122 and has three pressure stations therein. Pressure station 124 is located in inlet 118 and senses static pressure, $P_{S'}$, on the outside of the divergent portion of the diffuser. Pressure station 126 is located within settling section 120 and preferably senses total pressure, $P_{T'}$, therein, and pressure station 128 at the throat of exhaust nozzle 122 senses static pressure, $P_V$, therein.

The probe is purposely designed to be a poor diffuser so that pressure $P_{T'}$ will fall off rapidly with increases in the numerical angle of attack. Pressure $P_{S'}$ is taken at the subsonic diffuser cone since static pressures on a cone are less sensitive to changes in angle of attack than static pressures taken on a cylindrical body. These two pressure stations are especially taken so that the ratio of $P_{T'}$ to $P_{S'}$ varies with angle of attack. The throat of the nozzle in which static pressure $P_V$ is taken should be dimensioned so that choking will occur, but must be of such a size that a normal shock system becomes stable in the subsonic diffuser portion of the engine inlet and not forward of the engine.

Valve 130 controls the area of variable bleed 114, the valve being connected to shaft 132 in Mach computer 134. Flexible diaphragm 136 is connected to shaft 132 and is responsive on opposite sides to two of the Mach probe pressures. Chamber 138 on the upper side of the diaphragm is connected to pressure station 128 in exhaust nozzle 122 and chamber 140 on the lower side of the diaphragm is connected to pressure station 124 on inlet 118. Chamber 142 in the lower end of Mach computer 134 is connected to pressure station 126 within settling portion 120. The lower end of shaft 132 extends into chamber 142 and is subject to total pressure $P_{T'}$.

It is known that $$\frac{P_{T'}}{P_{S'}} = f(M)$$

where M is Mach number. Further, multiplying this ratio by any constant, $k_1$, $k_2$, etc., will not change the shape of the resulting $f(M)$ curve, only absolute valves.

Since exhaust nozzle 122 in Mach probe 116 is a sonic nozzle $$P_V = k_1 P_{T'}$$

where $k_1$ = a constant, and substitution in the expression for the ratio of the total pressure $P_{T'}$ in the settling chamber minus the static pressure $P_V$ at the exhaust nozzle throat to the static pressure $P_{S'}$ on the outside of the diffuser inlet gives the following equivalents:

$$\frac{P_{T'} - P_V}{P_{S'}} = \frac{P_{T'} - k_1 P_{T'}}{P_{S'}} = \frac{k_2 P_{T'}}{P_{S'}} = f(M)$$

where $k_2 = (1 - k_1)$, a constant. Therefore, the pressure ratio expressions $$\frac{P_{T'}}{P_{S'}} \text{ and } \frac{P_{T'} - P_V}{P_{S'}}$$

are each a true function of Mach number. The pressure $P_V$ is employed to permit the use in Mach computer 134 of a differential area mechanism having no evacuated section.

The forces across the Mach computer are balanced when $$P_V A_{136} = P_{T'} A_{132} + P_{S'} (A_{136} - A_{132})$$

where $A_{136}$ is the area of diaphragm 136 and $A_{132}$ is the area of shaft 132. Since $P_V = k_1 P_{T'}$, substitution in the force balance equation gives:

$$k_1 P_{T'} A_{136} = P_{T'} A_{132} + P_{S'} (A_{136} - A_{132})$$

$$P_{T'} (k_1 A_{136} - A_{132}) = P_{S'} (A_{136} - A_{132})$$

$$\frac{P_{T'}}{P_{S'}} = \frac{(A_{136} - A_{132})}{(k_1 A_{136} - A_{132})}$$

Thus, the area ratio of Mach computer 134 defines a given $$\frac{P_{T'}}{P_{S'}}$$

which, as has been demonstrated above, is directly related to the desired pressure ratio $$\frac{P_{T'} - P_V}{P_{S'}}$$

Each of these pressure ratios, as also has been demonstrated, as well as the area ratio defines a Mach number.

By means of Mach probe 116 and Mach computer 134, therefore, a Mach number or angle of attach indication is imparted to valve 130 by sensing the ratio of the total pressure in the settling chamber minus the static pressure at the exhaust nozzle throat to the static pressure on the outside of the diffuser inlet.

It is to be understood that when Mach computer 134 is balanced, or in its null position, valve 130 is only partially restricting variable bleed 114. That is, valve 130 is in a position somewhere between the limits of its travel. Upon a change in pressure ratio resulting from a change in angle of attack or Mach number, the valve will move either to close the bleed and increase fuel flow to engine 10 or open the bleed and decrease fuel flow to the engine, depending upon the change. When bleed 114 is closed by the valve the fuel control will be metering to its rich limit and when valve 130 is in its maximum open position as determined by adjustable stop 144 the control will be metering to its lean limit.

In effect, the Mach control will reset the fuel control to a false airflow signal; to a false low airflow signal if overspeeding exists, and to a false high airflow signal if underspeeding exists. The Mach control exhibits variable gain with altitude, but the constants of the system can be made to provide optimum gain setting at cruise conditions and the control will then ride the rich limit stop during boost and the lean limit stop during dive. The shape of the response curve of the probe can be determined by suitable selection and location of the pressure stations around the perforated convergent-divergent inlet.

Figure 2:
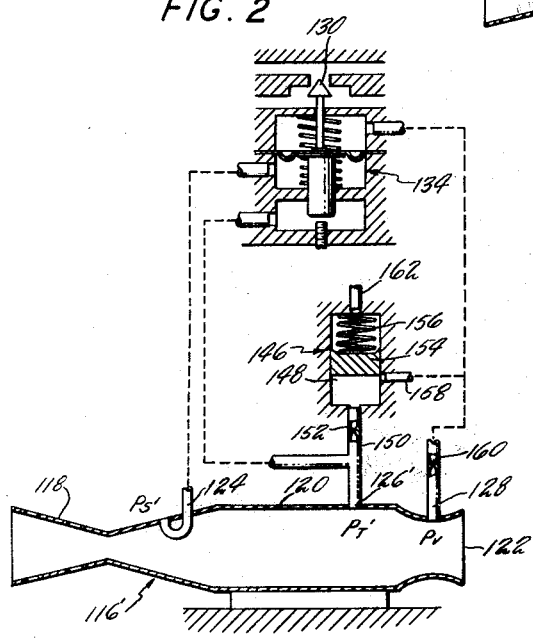
Fig. 2 shows an alternate arrangement of the Mach control.

In Fig. 2 an alternate arrangement of the Mach probe is disclosed. Because the combination of high temperatures and high loads encountered during high speed flight at low altitudes can exceed the allowable limits for airplane and engine components, it is desired to reduce the low altitude equilibrium Mach number of the airplane. This is accomplished by increasing the apparent value of $P_V$ by bleeding the higher pressure $P_{T'}$ into the $P_V$ line by means of relief valve 146. $P_{T'}$ pressure station 126′, shown here as a static pressure station although it could be a total pressure station as shown in Fig. 1 at 126, is connected to chamber 148 in the relief valve by line 150, fixed restriction 152 being provided in the line to permit pressure build-up in the chamber. Piston 154 in the chamber is loaded by spring 156 in a direction resisting the $P_{T'}$ pressure and controls the port area of line 158 connecting the chamber and the $P_V$ pressure line. Restriction 160 also is provided to permit pressure build-up. Line 162 vents chamber 148 to atmospheric pressure, $P_S$.

The Mach control of Fig. 2 senses Mach number as a function of the quantity $$(P_{T'}-P_{S'})/(P_{T'}-P_V)$$

hence a reduction in the denominator while flying at a given Mach number would give the fuel control an indication of Mach number higher than the actual number.

Relief valve 146 bleeds $P_{T'}$ pressure into the $P_V$ line as a function of the difference between $P_{T'}$ and $P_S$. The value can be set to stop the bleeding at any value of $P_{T'}-P_S$, which is a function of altitude and Mach number. It is possible, therefore, to obtain a shaped or linear variation of equilibrium flight Mach number through a wide range of values, below the control design value, at sea level to the design value at a wide range of altitudes, depending on the constants of the system such as spring 156, the port design between chamber 148 and line 158, and restrictions 152 and 160.

It is to be understood that the invention is not limited to the specific embodiments herein illustrated and described, but may be used in other ways without departure from its spirit as defined by the following claims.

I claim:

1. A Mach probe having a perforated convergent-divergent inlet diffuser, a settling section and an exhaust nozzle, means for sensing static pressure on the outer surface of the diverging portion of said inlet diffuser and means for sensing pressure in said settling section in combination with a fuel system for a guided missile including a conduit through which fuel flows, valve means in said conduit for controlling fuel flow therethrough, and means responsive to a ratio of said settling section pressure to said inlet diffuser pressure for adjusting said valve means.

2. A Mach probe having a perforated convergent-divergent inlet diffuser, a settling section and an exhaust nozzle, means for sensing static pressure $P_{S'}$ on the outer surface of the diverging portion of said inlet diffuser, means for sensing total pressure $P_{T'}$ in said settling section and means for sensing static pressure $P_V$ in the throat of said exhaust nozzle in combination with a fuel system for a guided missile including a conduit through which fuel flows, valve means in said conduit for controlling fuel flow therethrough, and means responsive to the pressure ratio $$(P_{T'}-P_V)/P_{S'}$$

for adjusting said valve means.

3. A Mach probe having a perforated convergent-divergent inlet diffuser, a settling section and an exhaust nozzle, means for sensing static pressure $P_{S'}$ on the outer surface of the diverging portion of said inlet diffuser, means for sensing pressure $P_{T'}$ in said settling section and means for sensing static pressure $P_V$ in the throat of said exhaust nozzle in combination with a fuel system for a guided missile including a conduit through which fuel flows, valve means in said conduit for controlling fuel flow therethrough, means responsive to the pressure ratio $$(P_{T'}-P_V)/P_{S'}$$

for adjusting said valve means, and means for increasing the apparent value of the $P_V$ pressure.

4. A Mach probe having a perforated convergent-divergent inlet diffuser, a settling section and an exhaust nozzle, means for sensing static pressure $P_{S'}$ on the outer surface of the diverging portion of said inlet diffuser, means for sensing pressure $P_{T'}$ in said settling section and means for sensing static pressure $P_V$ in the throat of said exhaust nozzle in combination with a fuel system for a guided missile including a conduit through which fuel flows, valve means in said conduit for controlling fuel flow therethrough, means responsive to the pressure ratio $$(P_{T'}-P_V)/P_{S'}$$

for adjusting said valve means, and means for increasing the apparent value of the $P_V$ pressure by bleeding the $P_{T'}$ pressure thereto.

5. A Mach probe having a perforated convergent-divergent inlet diffuser, a settling section and an exhaust nozzle, means for sensing static pressure $P_{S'}$ on the outer surface of the diverging portion of said inlet diffuser, means for sensing pressure $P_{T'}$ in said settling section and means for sensing static pressure $P_V$ in the throat of said exhaust nozzle in combination with a fuel system for a guided missile including a conduit through which fuel flows, valve means in said conduit for controlling fuel flow therethrough, means responsive to the pressure ratio $$(P_{T'}-P_V)/P_{S'}$$

for adjusting said valve means, means for increasing the apparent value of the $P_V$ pressure by bleeding the $P_{T'}$ pressure thereto, and valve means for controlling the bleeding of $P_{T'}$ pressure to said $P_V$ pressure.

References Cited in the file of this patent

UNITED STATES PATENTS

| | | |
|---|---|---|
| 2,629,569 | Andrews | Feb. 24, 1953 |
| 2,642,237 | Page | June 16, 1953 |
| 2,645,240 | Drake | July 14, 1953 |
| 2,765,619 | Peterson | Oct. 9, 1956 |
| 2,809,492 | Arkawy | Oct. 15, 1957 |